Nov. 11, 1941.  J. G. RIDEOUT  2,262,204
DISHPAN
Filed Feb. 9, 1938
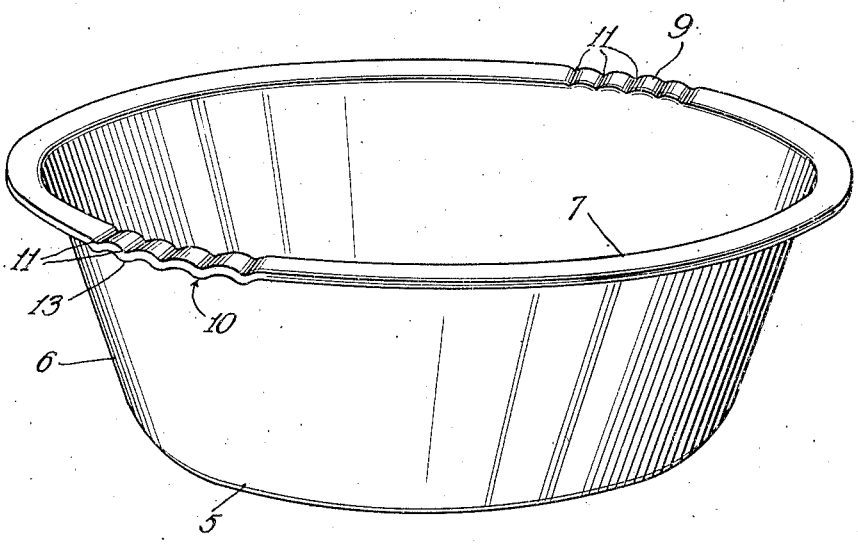
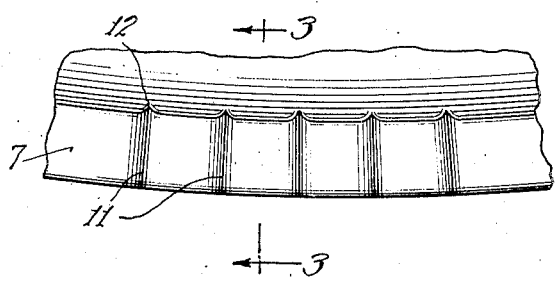 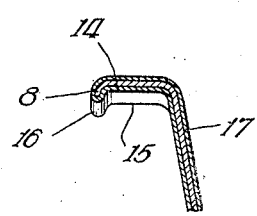
Inventor
John Gordon Rideout
By: Zabel Carlson Fritzlough & Wells
Attys.

Patented Nov. 11, 1941

2,262,204

UNITED STATES PATENT OFFICE 2,262,204

DISHPAN

John Gordon Rideout, Cleveland, Ohio, assignor to Columbian Enameling & Stamping Co., Inc., Terre Haute, Ind., a corporation of Indiana Application February 9, 1938, Serial No. 189,535

1 Claim. (Cl. 220—94)

The present invention relates to dish pans, trays and similar vessels which are to be lifted and carried about in the hands. It is particularly applicable to such vessels as are apt to be lifted and moved about when the hands or the vessel or both are wet. It is the purpose of the present invention to provide a handle portion on such vessels without changing the contour thereof and without providing any holes or sharp edges. The handle portion may be gripped by the fingers so as to prevent the fingers slipping on the pan even if they are wet. The invention is readily applicable to vessels that are adapted to nest. It further does not require additional material and actually provides a hand grip out of the material of the vessel without sacrificing strength or shape of the vessel.

The present invention contemplates the provision of a dish pan or similar vessel with a novel handle construction embodied therein in such a way as to give all of the advantages of a smooth roll rim type of pan, while providing means whereby the fingers can engage the rim in such a way as not to slip.

The features and advantages of the invention will appear more fully as the description proceeds in connection with the accompanying drawing wherein the preferred form of the invention is shown. It is to be understood, however, that the drawing and description are illustrative only, and are not to be taken as limiting the invention except insofar as it is limited by the claim.

In the drawing,

Fig. 1 is a perspective view showing a dish pan of the oval type embodying my invention;

Fig. 2 is an enlarged fragmentary plan view illustrating the finger grip portion of the rim of the dish pan, and Fig. 3 is a sectional view on the line 3—3 of Fig. 2.

Referring now to the drawing, the invention is shown as embodied in a dish pan 5 which may be of any suitable shape. The shape shown is the well-known oval shape with the side wall 6 flaring outwardly slightly toward the top. At the top, the pan is provided with a rim 7 that projects outwardly and is rolled down to provide a depending lip 8 spaced from the body of the pan.

The rim is provided with two diametrically opposed finger receiving portions 9 and 10 which portions are so formed as to enable the person handling the dish pan to readily engage them with the fingers and thus hold the pan without danger of the fingers slipping off. Each finger grip portion is constructed by forming a series of transverse grooves 11 across the rim 7, these grooves being extended down through the adjacent edge of the pan at 12 and down through the lip 8 at 13. The grooves are actually formed by corrugating the metal of the rim, the corrugations extending transversely of the rim and through the downwardly turned portion of the rim (see Fig. 1). The grooves 11 combine with the lip 8 to produce a series of spaced downwardly facing pockets, the depth of which is shown clearly in Fig. 3, where the numeral 14 indicates the base of the pocket, the numeral 15 the edge thereof which runs transversely of the rim 7 and the numeral 16 the edge thereof which extends along the rim 7. These pockets, of which there are four in each hand grip portion, receive the fingers and make it easy for the person handling the dish pan to hold it, even though the hands are wet. The pan as shown is constructed of sheet metal covered with porcelain enamel, indicated at 17, although of course this is not a limitation of the invention which may apply to any pan, whether or not it is enamelled.

Having thus described my invention, what I claim as new and desire to secure by Letters Patent is:

A dish pan having a rim at the top thereof which is turned outwardly and downwardly, said rim having at two oppositely disposed points thereof corrugated portions providing closely spaced, transversely extending grooves, the corrugations in said portions traversing both the outwardly turned and downwardly turned portions of the rim, thereby providing finger-receiving pockets in the rim.

JOHN GORDON RIDEOUT.